C. A. WEED.
STAY-RODS FOR WAGON-BOLSTERS.

No. 187,953. Patented Feb. 27, 1877.

UNITED STATES PATENT OFFICE.

CLINTON A. WEED, OF RACINE, WISCONSIN.

IMPROVEMENT IN STAY-RODS FOR WAGON-BOLSTERS.

Specification forming part of Letters Patent No. 187,953, dated February 27, 1877; application filed January 20, 1877.

*To all whom it may concern:*

Be it known that I, CLINTON A. WEED, of Racine, in the county of Racine, and in the State of Wisconsin, have invented certain new and useful Improvements in Device for Preventing the Rocking of Wheeled Vehicles; and do hereby declare that the following is a full, clear, and exact description thereof, reference being had to the accompanying drawings, and to the letters of reference marked thereon, making a part of this specification.

The nature of my invention consists in the use of certain clevices, hooked screw-rods, and clamps, with the bolsters and wheels of a wagon, which carries a thrashing-machine or other power, as will be hereinafter more fully set forth.

In order to enable others skilled in the art to make and use my invention, I will now proceed to describe its construction and operation.

Figure 1:
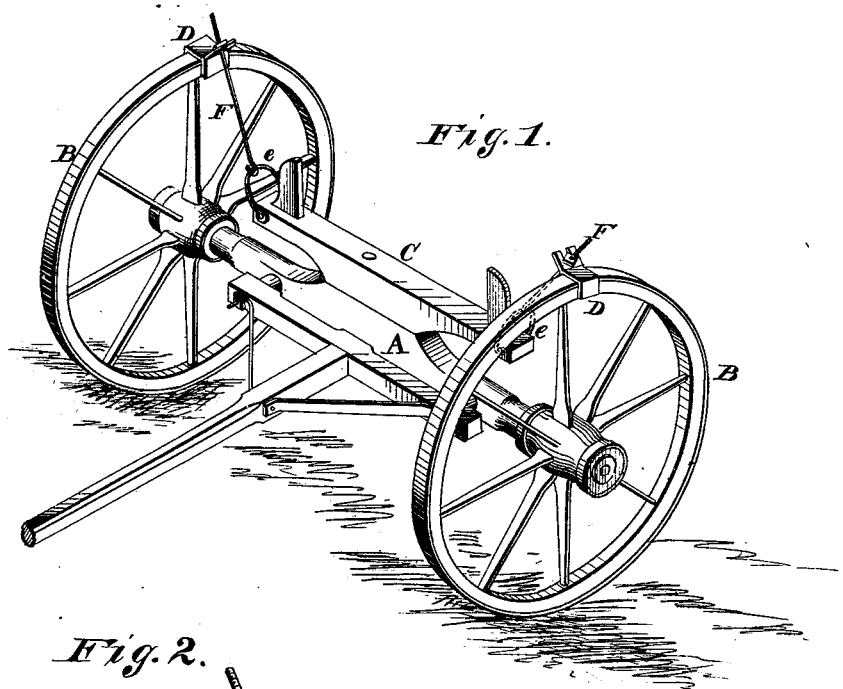
Figure 2:
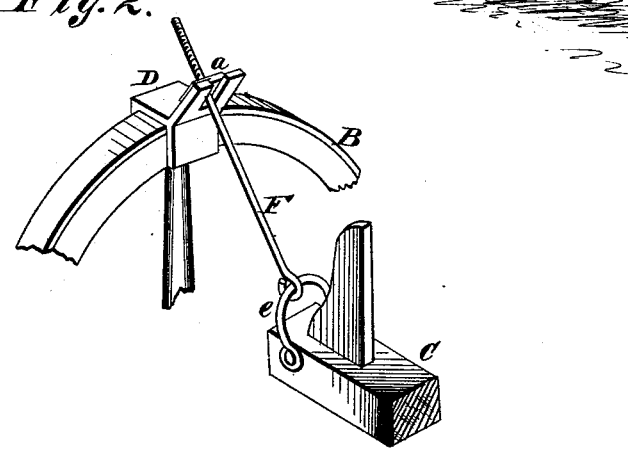

In the accompanying drawings, making part of this specification, Figures 1 and 2 are both perspective views of my invention.

In the figures, A represents the axle of a vehicle, and B B the wheels of same. C represents the bolster, which is made in the usual manner.

It is well known that in those wagons which are used for carrying powers for thrashing grain and other purposes, the wheels and bolsters are rendered unsteady by the continual lateral strain upon them. My invention is designed to prevent this unsteadiness, and to give solidity to the wagon, which is the base upon which the power works.

To accomplish this I take two clevises, *e e*, and secure one firmly to each end of the bolster. I then use two clamps, D D, of any suitable construction, and secure them, one to each wheel. These clamps should be provided with wings projecting inward and upward from the wheels, at about an angle of forty-five degrees, and these wings should be slotted to receive between the parts a suitable metallic rod. F F represent rods, which are provided with a hook at one end and a screw-thread at the other. The hooks upon the rods are caught into the clevises upon the bolster, and the rods then passed into the slots in the clamps D D. These clamps should be put in position on the top of the wheel. After passing the rods into the clamps I pass nuts over the ends of the rods, and tighten them up until the rods bind the wheels and the bolster so firmly together that the working of the power will not cause lateral or other play of either.

By this arrangement I am enabled to work the power more smoothly and with less rack and wear, not only to it but to the wagon.

Having thus fully described my invention, what I claim as new, and desire to secure by Letters Patent, is—

In combination with the axle A and wheels B B, the bolster C, connected to the wheels by means of clamps, screw-rods, and clevises, substantially as herein set forth.

In testimony that I claim the foregoing I have hereunto set my hand this 2d day of January, 1877.

CLINTON A. WEED.

Witnesses:
  W. T. BULL,
  JOHN TAPLEY.